(12) United States Patent
Tao et al.

(10) Patent No.: US 10,007,412 B2
(45) Date of Patent: Jun. 26, 2018

(54) TONE MASTERING SYSTEM WITH CREATIVE INTENT METADATA

(71) Applicant: Samsung Electronics Co., Ltd., Suwon-si (KR)

(72) Inventors: Li Tao, Mountain View, CA (US); Yeong-Taeg Kim, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 18 days.

(21) Appl. No.: 14/993,944

(22) Filed: Jan. 12, 2016

(65) Prior Publication Data

US 2016/0381335 A1     Dec. 29, 2016

Related U.S. Application Data

(60) Provisional application No. 62/184,065, filed on Jun. 24, 2015.

(51) Int. Cl.
*G06F 3/0484* (2013.01)
*H04N 9/68* (2006.01)

(52) U.S. Cl.
CPC .......... *G06F 3/04845* (2013.01); *H04N 9/68* (2013.01)

(58) Field of Classification Search
None
See application file for complete search history.

(56) References Cited

U.S. PATENT DOCUMENTS

| | | | |
|---|---|---|---|
| 2013/0022289 A1* | 1/2013 | Umeda | G06T 5/002 382/274 |
| 2013/0106923 A1 | 5/2013 | Shields et al. | |
| 2013/0335438 A1 | 12/2013 | Ward | |
| 2014/0002478 A1* | 1/2014 | Ballestad | H04N 1/6027 345/589 |
| 2015/0117791 A1 | 4/2015 | Mertens et al. | |
| 2016/0005349 A1 | 1/2016 | Atkins et al. | |
| 2016/0292834 A1* | 10/2016 | Tsuru | G06T 5/009 |

FOREIGN PATENT DOCUMENTS

JP     2015517250 A     6/2015

OTHER PUBLICATIONS

Foreign Communication From a Related Counterpart Application, PCT Application No. PCT/KR2016/010852, International Search Report and Written Opinion dated Jan. 2, 2017, 14 pages.

\* cited by examiner

*Primary Examiner* — Vu Nguyen

(57) ABSTRACT

A method, apparatus, and non-transitory computer readable medium for video tone mapping. The method includes receiving the video and metadata at least partially representative of a global tone mapping function. The method further includes determining the global tone mapping function based at least on the metadata and a characteristic of the display and generating a tone mapped video by applying the global tone mapping function to the video and using the peak luminance value of the display in the application of the global tone mapping function.

19 Claims, 11 Drawing Sheets

TONE MASTERING SYSTEM WITH CREATIVE INTENT METADATA

CROSS-REFERENCE TO RELATED APPLICATION(S) AND CLAIM OF PRIORITY

This application claims priority under 35 U.S.C. § 119(e) to U.S. Provisional Patent Application No. 62/184,065 filed on Jun. 24, 2015, entitled "Tone Mastering System with Creative Intent Metadata." The above-identified provisional patent application is hereby incorporated by reference in its entirety.

TECHNICAL FIELD

This disclosure relates generally to video tone processing. More specifically, this disclosure relates to a tone mastering system with creative intent metadata.

BACKGROUND

At a studio, users can produce mastered videos using a mastering monitor to optimize or improve the luminance or brightness levels of the original videos. Often times, the mastering monitor used to master the video has different peak luminance or brightness levels than those of target displays upon which the videos are later displayed. Typically, the maximum luminance level of the mastering monitor is much larger than the maximum luminance level of the target display.

SUMMARY

This disclosure provides a tone mastering system using creative intent metadata.

In a first embodiment, a method for video tone mapping is provided. The method includes receiving the video and metadata at least partially representative of a global tone mapping function. The method further includes determining the global tone mapping function based at least on the metadata and a characteristic of the display and generating a tone mapped video by applying the global tone mapping function to the video and using the peak luminance value of the display in the application of the global tone mapping function.

In a second embodiment, an apparatus for video tone mapping is provided. The apparatus includes a memory and at least one processor operably connected to the memory. The at least one processor is configured to receive the video and metadata at least partially representative of a global tone mapping function. The at least one processor is further configured to determine the global tone mapping function based at least on the metadata and a characteristic of the display and generate a tone mapped video by applying the global tone mapping function to the video and using the peak luminance value of the display in the application of the global tone mapping function.

In a third embodiment, a non-transitory computer readable medium comprising program code for video tone mapping is provided. The program code, when executed by at least one processor, causes the at least one processor to process a video using at least first and second tone mapping functions to receive the video and metadata at least partially representative of a global tone mapping function, determine the global tone mapping function based at least on the metadata and a characteristic of the display, and generate a tone mapped video by applying the global tone mapping function to the video and using the peak luminance value of the display in the application of the global tone mapping function.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc, an erasable memory device, static RAM, dynamic RAM, or flash memory.

Various functions described below can be implemented or supported by a processor coupled to a computer readable medium storing one or more computer programs. As such, the processor is a special purpose processor for performing the functions defined by the one or more computer programs.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
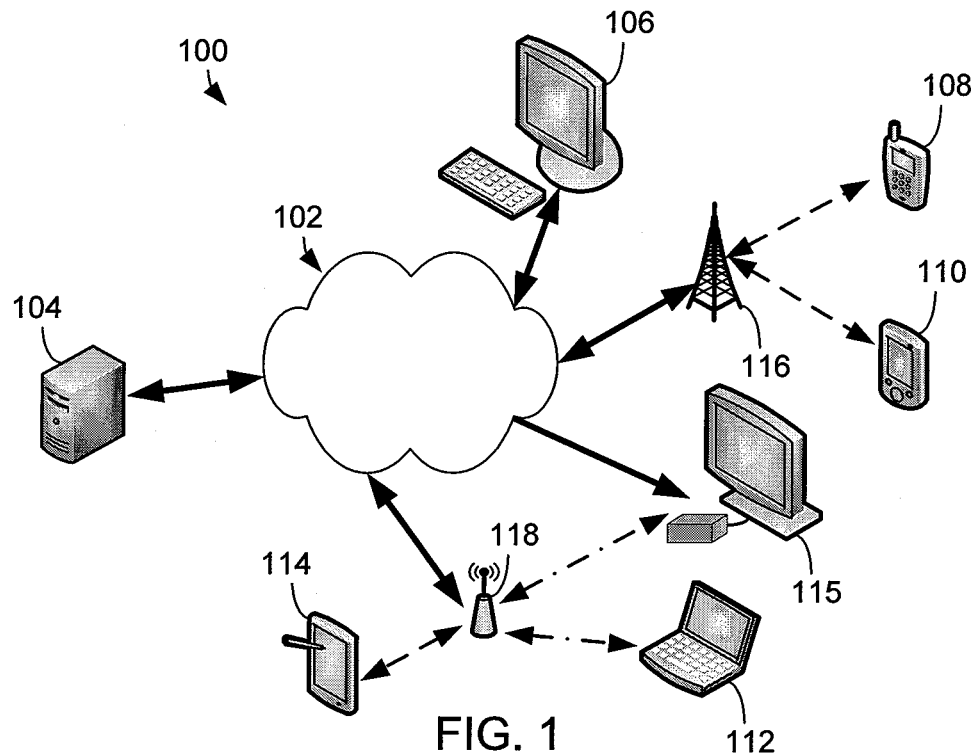
FIG. 1 illustrates an example computing system in which various embodiments of the present disclosure may be implemented.

FIGS. 1 through 14, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Embodiments of the present disclosure recognize that displaying the mastered video at on a display with a maximum luminance level that is lower than the maximum luminance level in the mastered video can reduce the quality of the video. For example, portions of the mastered video with luminance levels greater than the maximum luminance level of the target display may be clipped or limited to the maximum luminance level of the target display, thereby limiting the range of luminance values of the video displayed.

Taking an example where a studio already mastered a movie with a mastering monitor having maximum luminance level of M-nit, a user may want the mastered video to have a different peak luminance level of N-nit for a target display where N<M. In such case, the user may need to re-master the original video file using a mastering monitor having a maximum luminance level of N-nit. Embodiments of the present disclosure recognize that this process can be time intensive and costly. In another example, the user may use a tone mapping method using already mastered video to generate a tone mapped video with algorithms or software that down tone maps from the higher mastering monitor luminance level to the lower target display luminance level. Embodiments of the present disclosure recognize that this process can produce unsatisfactory results, such as, saturation of highlighted objects or scenes.

Accordingly, various embodiments of the present disclosure produce a tone mapped video using creative intent metadata. In one or more embodiments, the adaptive tone mapping based on local contrast may reduce costs while providing improved video quality regarding saturation of highlighted objects or scenes.

One or more embodiments relate to data for rendering images on a display device. In one embodiment, a method comprises one or more applications of tone mapping of images, graphics, and/or video (collectively referred to simply as "video" herein) to facilitate remastering content and/or to facilitate high dynamic range (HDR) displays. For example, one or more embodiments are described herein that can facilitate remastering to different luminance peak levels and/or that can facilitate tone mapping for displays having luminance peak levels different than that of the mastering monitor. It will be appreciated that the various embodiments disclosed herein can be used either alone or in combination.

In the following, systems and methods are described in greater detail. The symbol Q denotes perceptual quantizer. The symbol HEVC denotes high efficiency video coding. The symbol HDR denotes high dynamic range.

FIG. 1 illustrates an example computing system 100 in which various embodiments of the present disclosure may be implemented. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100 on one or more communication channels. The network 102 may communicate Internet Protocol (IP) packets, frame relay frames, or other information between network addresses. The network 102 may include one or more local area networks (LANs): metropolitan area networks (MANs); wide area networks (WANs); all or a portion of a global network, such as the Internet; or any other communication system or systems at one or more locations.

In various embodiments, network 102 includes a broadcast and broadband networks and communication channels for communicating video data (e.g., video files including metadata and audio content) to client devices 106-115. The broadcasting elements of network 102, such as cable and satellite communication links, provide broadcast of video data to client devices 106-115. The broadband elements of network 102, Internet, wireless, wireline, and fiber optic network links and devices, provide for streaming and download of video data.

The network 102 facilitates communications between one or more servers 104 and various client devices 106-115. Each of the servers 104 includes any suitable computing or processing device that can provide computing services for one or more client devices. Each of the servers 104 could, for example, include one or more processing devices, one or more memories storing instructions and data, and one or more network interfaces facilitating communication over the network 102. For example, one or more of the servers 104 may include processing circuitry for mastering a video or for tone mapping a video based on local contrast, as discussed in greater detail below.

Each client device 106-115 represents any suitable computing or processing device that interacts with at least one server or other computing device(s) over the network 102. As will be discussed in greater detail below, the client devices 106-115 receive video (e.g., a mastered video file to be tone mapped or a tone mapped video file to be displayed) and may include processing circuitry for tone mapping a video based on local contrast. The client devices 106-115 each either includes or is connected to a display device for display of tone mapped video. In this example, the client devices 106-115 include a computer 106, a mobile telephone or smartphone 108, a personal digital assistant (PDA) 110, a laptop computer 112, tablet computer 114; and a set-top box and/or television 115. However, any other or additional client devices could be used in the communication system 100. In this example, some client devices 108-114 communicate indirectly with the network 102. For example, the client devices 108-110 communicate via one or more base stations 116, such as cellular base stations or eNodeBs. Also, the client devices 112-115 communicate via one or more wireless access points 118, such as IEEE 802.11 wireless access points. Each client device 112-115 can also receive or be used to create creative intent metadata (CIm). Note that these are for illustration only and that each client device could communicate directly with the network 102 or indirectly with the network 102 via any suitable intermediate device(s) or network(s).

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
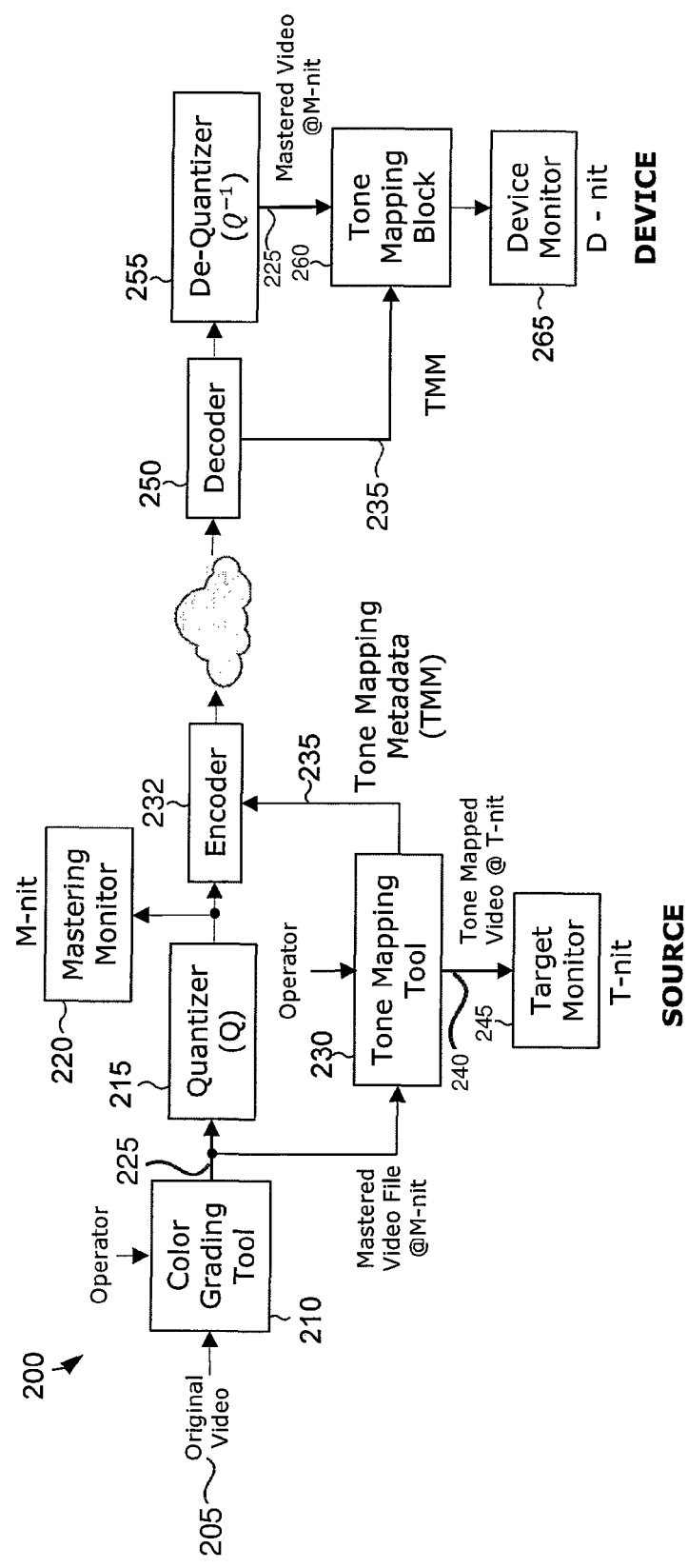
FIG. 2 illustrates a mirrored creative intent system according to one embodiment of the present disclosure.

FIG. 2 illustrates a process for a mirrored creative intent system 200 according to various embodiments of the present disclosure.

A user, such as a colorist (C), color grades an original video file 205 at, for example, a studio. The original video file 205 is input into a color grading tool 210, which generates a color graded output that is fed into a quantizer (Q) block 215 and encoding block 232 (e.g., an H.265 codec) for encoding. The output of the Q block (215) is connected to a mastering monitor 220 to provide the user visual feedback of the color graded adjustments. In certain embodiments, the mastering monitor can be a high contrast display, such as a display capable of 4,000 nit peak luminance. However, the mastering monitor 220 may have very high contrast in comparison with a number of consumer display device (e.g., consumer-grade television sets having peak luminance of about 150 nits to about 750 nits or more). As a result, the mastered video 225 displayed on the mastering monitor 220 may look different than displayed on a home television set if the mastered video 225 is not adjusted. For example, because the mastering monitor 220 can display brighter images than a home television set, the bright portions of the mastered video displayed on the home television set may clip or saturate and, thus, image details may be lost.

To account for differences in display technologies, the user operates the tone mastering module (TMM) 230 to generate creative intent data (CIm) 235 that can be used with the mastered video file 225 for proper display on lower contrast devices. For example, the TMM 230 receives as input the mastered video file 225 and control parameters from the colorist. The TMM 230 provides a tone mapped version 240 of the mastered file 225 to a second target monitor 245 to generate visual feedback for the colorist. For example, the target monitor 245 can have a lower peak luminance level compared to the mastering monitor 220. In one example aspect, the target monitor 245 can model display devices that are more similar to what the end user might use to watch the video file 205 than compared to the mastering monitor 220. For example, the original video file 205 can be mastered using a mastering display 220 having a peak luminance of 4,000 nits. The colorists can remaster the mastered video file 225 using the TMM 230 for a target monitor of 1,000 nits. Based on the way in which the colorist tone maps the mastered video file 225 for the lower peak luminance target monitor, the TMM 230 automatically generates and output CIm data 235 that is indicative of the colorist's tone mapping choices in way that the CIm data 235 is usable to tone map the mastered video 225 for a number of target monitors 245 having different peak luminance values. Moreover, it will be appreciated that the TMM 230 can also use the CIm data 235 directly to generate pre-generated remastered video files. It will also be appreciated that CIm data 235 can be used to remaster video files for display on devices having a variety of color spaces (e.g., sRGB, Adobe RGB 1998, DCI-P3, NTSC, rec.709, rec.2020, and the like).

As stated, the encoder 232 receives the Q encoded mastered file 225 and CIm 235 as inputs and generates an encoded video file combined with CIm 235 for transmission, e.g., over the Internet, or for distribution on a computer readable medium. At the receiver side or user side, the decoder 250 and the Q decoder (i-Q) block 255 decode the encoded mastered file. Additionally, the decoder 250 extracts the CIm 235 as input for the mirrored tone mastering module (m-TMM) 260. The m-TMM 260 uses the CIm 235 to adjust (e.g., tone map) the decoded mastered file for proper display on the user's device 265, which has a peak luminance value of 750 nit (which is less than the mastering monitor). For example, the m-TMM 260 automatically determines a tone mapping based on the CIm 235 and the capabilities/characteristics of the user's device 265.

Figure 3:
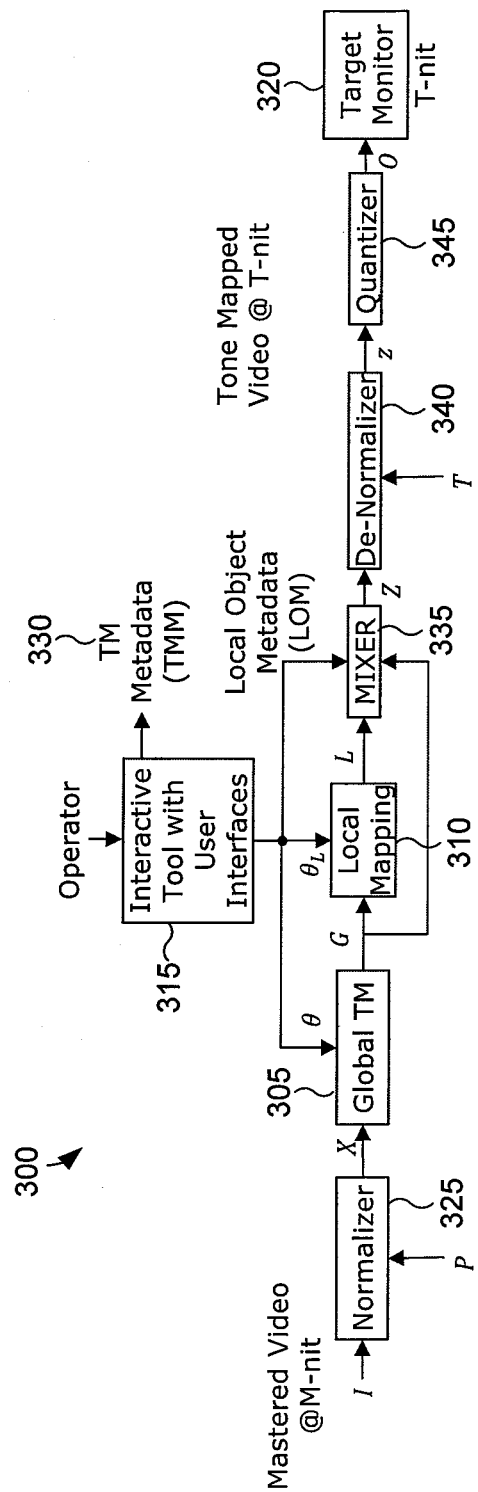
FIG. 3 illustrates an example tone master module with a global creative intent tone mapping curve and a local creative intent tone mapping curve in series according to one embodiment of the present disclosure.

FIG. 3 illustrates an example tone master module 300 with a global creative intent tone mapping curve (GCI-C) 305 and a local creative intent tone mapping curve (LCI-C) 310 in series according to various embodiments of the present disclosure.

As shown in FIG. 3, the TMM 300 includes a user interface 315, a global creative intent tone mapping curve (GCI-C) 305, a local creative intent tone mapping curve (LCI-C) 310, a normalizer 325, a mixer 335, a de-normalizer 340, a quantizer 345, and a target monitor 320. The normalizer 325 receives the video feed, I, and outputs a normalized video, X, define by: X=min(1,I/P). The user interface 315 receives user input to control the GCI-C 305 and LCI-C 310. The GCI-C 305 applies a constant tone curve over a frame and/or scene. The LCI-C 310 applies one or more tone curves that affect only particular regions of the frame and/or scene. Accordingly, the user interface 315 provides the user tools to adjust the GCI-C 305, as well as to create and adjust LCI-C 310. The mixer 335 takes the outputs (LOM, L and G) from the user interface 315, the GCI-C 305 and the LCI-C 310. The de-normalizer 340 receives the mixed video file, Z, and outputs a de-normalized video, z, defined by z=T Z. The quantizer 345 receives the de-normalized video, z, and quantizes the video for use on the target monitor 320. As stated, a target monitor 320 can display the tone mapped video 325 of the user input received by the user interface 315. The TMM 300 generates the CIm 330 based on the user's input into the user interface 315 to define the GCI-C 305 and the LCI-C 310.

In the embodiment shown in FIG. 3, the GCI-C 305 and LCI-C 310 are connected in series. As such, the GCI-C 305 first applies a tone mapping over a frame or scene of the input video file 335. The output of the GCI-C 305 is then fed to the LCI-C 310, which applies the one or more local tone maps to portions of the frame or scene that is specified by user input received by the user interface 315.

Figure 4:
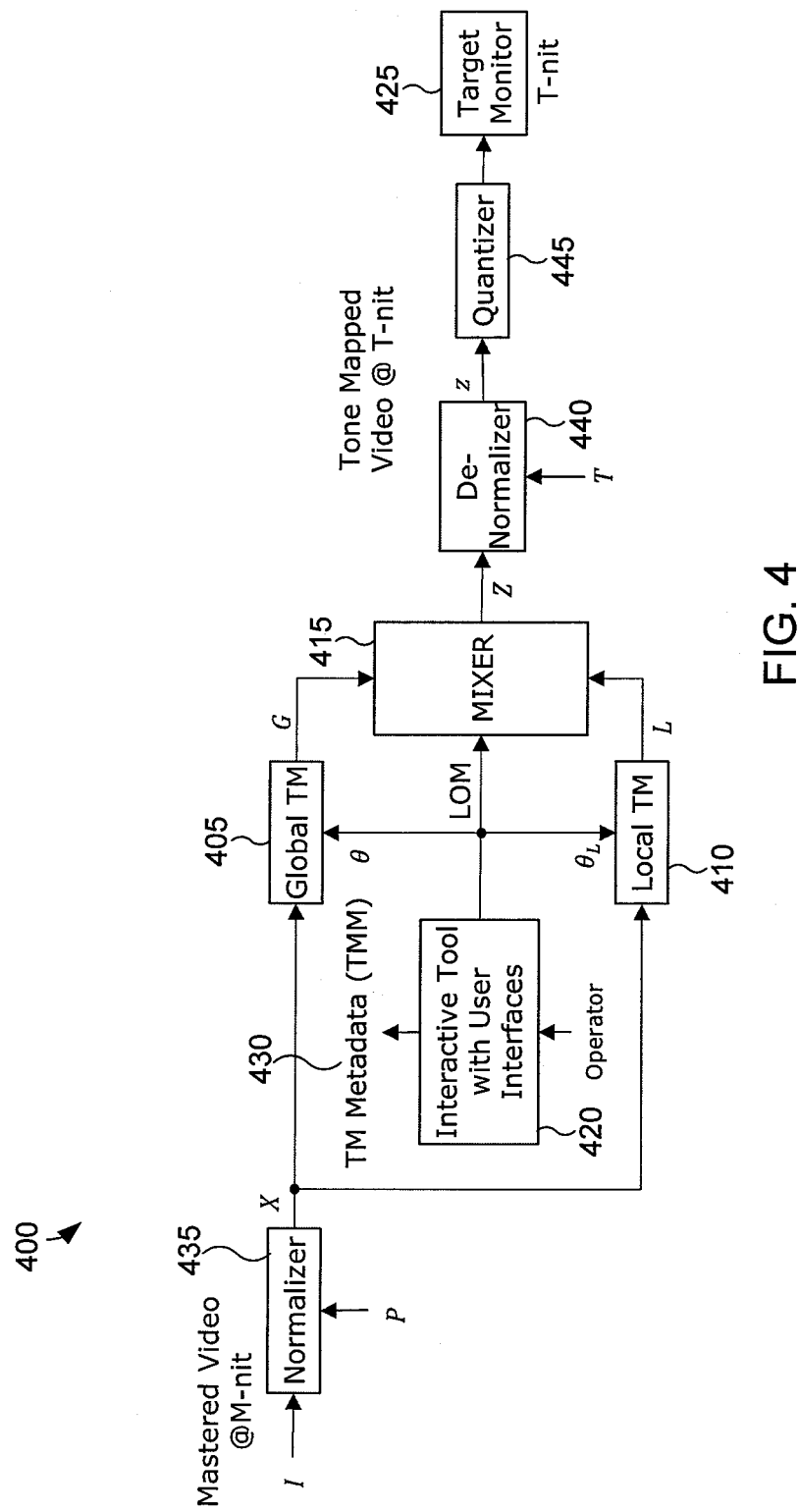
FIG. 4 illustrates an example tone master module with a global creative intent tone mapping curve and a local creative intent tone mapping curve in parallel with a mixer module according to one embodiment of the present disclosure.

FIG. 4 illustrates an example tone mapping module 400 with a global tone mapping curve 405 and a local tone mapping curve 410 in parallel with a mixer module 415 according to various embodiments of the present disclosure. The tone mapping module 400 includes a normalizer 435, a user interface 420, a global tone mapping module 405, a local tone mapping module 410, a mixer 415, a de-normalizer 440, a quantizer 445 and a target monitor 425.

As shown in FIG. 4, the TMM 400 includes a normalizer 435, a user interface 420, a global tone mapping module 405, a local tone mapping module 410, a mixer 415, a de-normalizer 440, a quantizer 445 and a target monitor 425. As described in the example embodiment of FIG. 5C, the GCI-C 405 applies a constant tone curve over a frame and/or scene, and the LCI-C 410 applies one or more tone curves that affect only particular regions of the frame and/or scene. The user interface 420 provides the user tools to adjust the global tone curve, as well as to create and adjust local tone curves. As stated, a target monitor 425 displays the results of the user input received by the user interface. The TMM 400 generates the CIm 430 based on the user's input into the user interface 420 to define the tone curves.

In the embodiment shown in FIG. 4, the GCI-C 405 and LCI-C 410 are connected in parallel. As such, the GCI-C 405 and the LCI-C 410 receive the input video file 435 and apply their respective tone curves. The output of the GCI-C 405 and LCI-C 410 are fed to the mixer 415, which also received user input form the user interface that determines how to combine the outputs of the GCI-C 405 and LCI-C 410. The mixer 415 weights the outputs of the GCI-C 405 and LCI-C 410 and generates the toned mapped output video file 440.

Figure 5A:
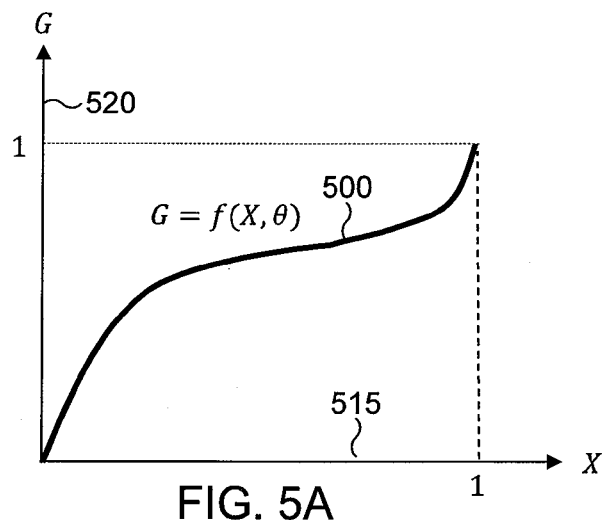
FIGS. 5A, 5B and 5C illustrate example global and local creative intent tone mapping functions according to various embodiments of the present disclosure.
Figure 5B:
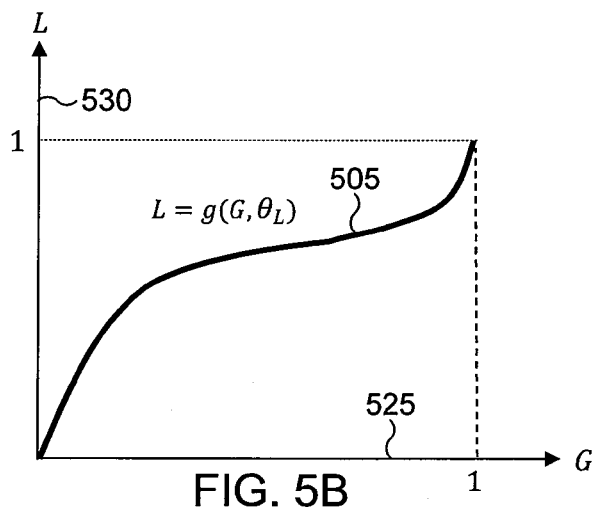
Figure 5C:
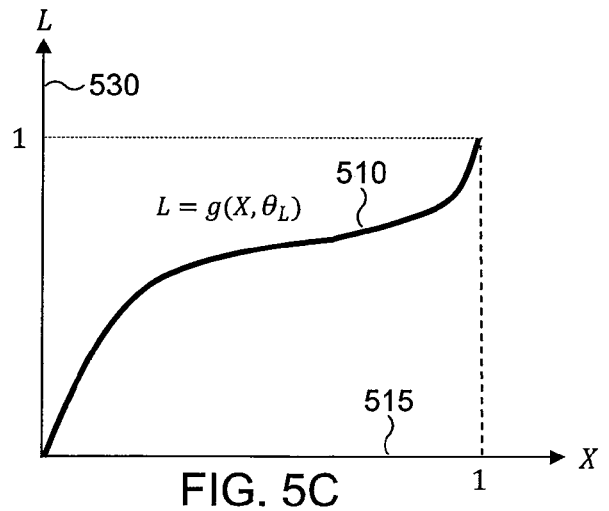

FIGS. 5A, 5B, and 5C illustrate example GCI-C and LCI-C tone mapping functions according to various embodiments of the present disclosure. In the various embodiments, the functions $f$ and $g$ are monotonically increasing functions.

FIG. 5A illustrates an example global tone mapping function 500 for the GCI-C 305 and 405 according to the various embodiments of the present disclosure. GCI-C 305 and 405 apply constant tone mapping curve over all the samples in a frame or all frames in a scene. It can be mathematically represented as $G=f(X,\theta_G)$ where X is the normalized input 515, G is the normalized global output 520, and where $\theta_G$ is (1) a set of parameters that characterizes the curve, (2) controlled by the colorist with the interactive tool, and (3) is the GCI-C metadata.

FIG. 5B illustrates an example local tone mapping function 505 for the LCI-C 310 according to the various embodiments of the present disclosure. The LCI-C 310 change from samples (object) to samples (object) in a frame. The LCI-C 310 can be mathematically represented as $L=g(G,\theta_L)$ where G is the normalized input 525, L is the normalized output 530, and where $\theta_L$ is (1) a set of parameters that characterizes the curve, (2) controlled by the colorist with the interactive tool, (3) and the LCI-C Metadata. The normalized input 525 can be the normalized output 520 when the GCI-C and the LCI-C are connected in series. Since LCI-C 310 change from an object to an object within a frame, we need more information about the geometric information about objects and the associated curve parameters ($\epsilon$), which is also part of Local Object Metadata (LOM).

FIG. 5C illustrates an example local tone mapping function 510 for the LCI-C 410 according to the various embodiments of the present disclosure. The LCI-C 410 change from samples (object) to samples (object) in a frame. The LCI-C 410 can be mathematically represented as $L=g(X,\theta_L)$ where X is the normalized input 515, L is the normalized output 530, and where $\theta_L$ is (1) a set of parameters that characterizes the curve, (2) controlled by the colorist with the interactive tool, (3) and the LCI-C Metadata. Since LCI-C 410 change from an object to an object within a frame, we need more information about the geometric information about objects and the associated curve parameters (.di-elect cons.), which is also part of Local Object Metadata (LOM).

In certain embodiments, an N-th order Explicit Bezier curve is used for the GCI-C 305 and 405 and the LCI-C 310 and 410, which is defined as $$B_N(t) = \sum_{k=0}^{N} \binom{N}{k} t^k (1-t)^{N-k} P_k$$

where t is the input variable, $$\binom{N}{k} = \frac{N!}{k!(N-k)!},$$

and $(P_0, P_1, \ldots, P_N)$ is the set of parameters that characterizes the Bezier curve. Hence, we can express $G=f(X)=B_N(X)$ with $\theta=(P_0, P_1, \ldots, P_N)$, $L=g(G)=B_N(G)$ with $\theta_L=(P_0, P_1, \ldots, P_N)$ and $L=g(X)=B_N(X)$ with $\theta_L=(P_0, P_1, \ldots, P_N)$.

An example fourth order explicit Bezier curve can be defined by $B_4(t)=4t(1-t)^3 P_1 + 6t^2(1-t)^2 P_2 + 4t(1-t)^3 P_3 + t^4$ for ($0 \le P_1, P_2, P_3 \le 1$). The set of ($P_1, P_2, P_3$) represents the metadata for a tone mapping curve.

Figure 6:
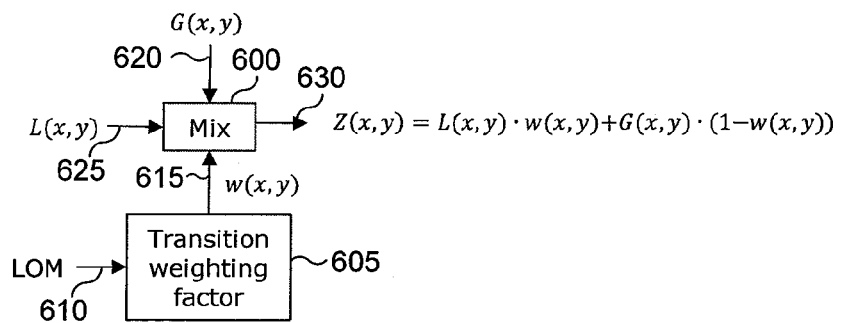
FIG. 6 illustrates an example mixer according to various embodiments of the present disclosure.

FIG. 6 illustrates an example MIXER 600 in FIGS. 3 and 4 according to various embodiments of the present disclosure. Using the tone master module 260, each pixel of a frame is processed by mixing the local tone mapping function 625 and the global tone mapping function 620, similar to 305 and 405, respectively. A transition weighting factor module 605 receives the LOM 610 as input and outputs a weighting factor 615. The mixer 600 receives the global mapping function 620, the local mapping functions 625, and the weighting factor 615 and outputs the mixed video file 630, Z. When the pixel is inside the first range 735, the output value (Z) 630 is equal to the output (Y) of the LCI-C 310. When the pixel is outside the second range 745, the output value (Z) 630 is equal to the original sample in the master module or the output (X) of the GCI-C 305 of the tone mastering module 260. The value of Z 630 monotonically dilates from Y to X as the pixels are processed in the transition range 740 using the transition weight factor 615.

Figure 7:
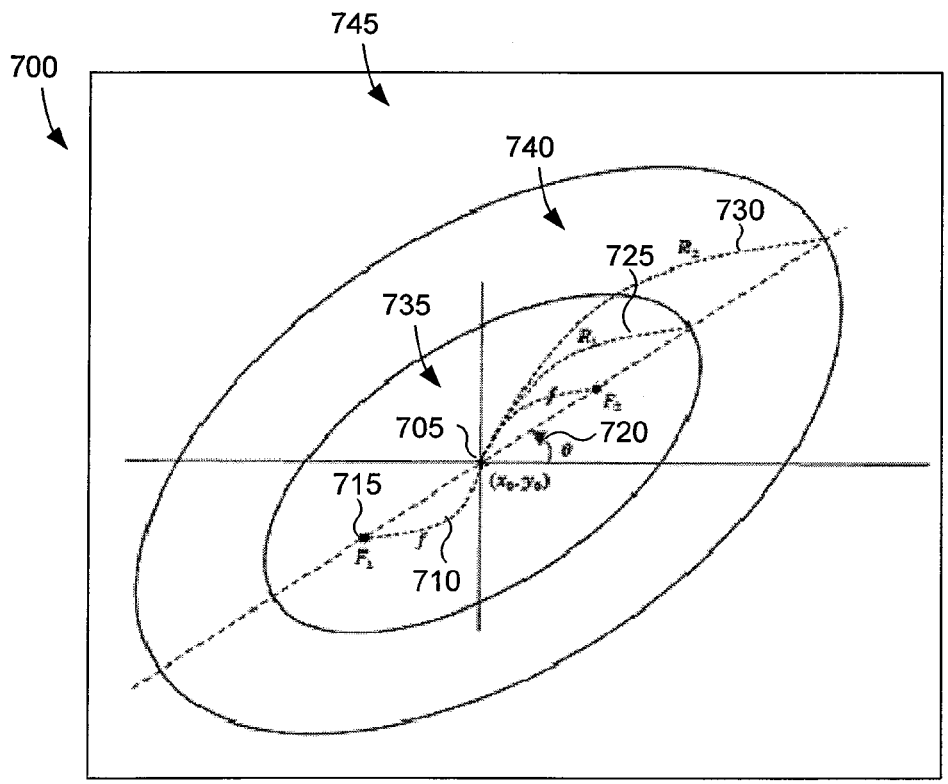
FIG. 7 illustrates an example of a local object expression according to various embodiments of the present disclosure.

FIG. 7 illustrates examples of local object expressions 700 according to various embodiments of the present disclosure. While an ellipse shape is used for the local object expressions 700, other shapes are within the scope of this disclosure.

The local object expressions 700 are used as the LCI-C 310 and 410. The ellipse is parameterized using (x0, y0) as the center 705, $f$ as the distance 710 to the focal points 715, $\theta$ as the degree of rotation 720, $R_1$ as a first range 725, and $R_2$ as a second range 730. The pixels inside the local area 735 are inside the first range 725. The pixels in global area 745 are outside of the second range 730. The pixels in the transition area 740 are between the first range 725 and the second range 730. The implementation of the local object expression is discussed in more detail with FIGS. 8A-8C.

Figure 8A:
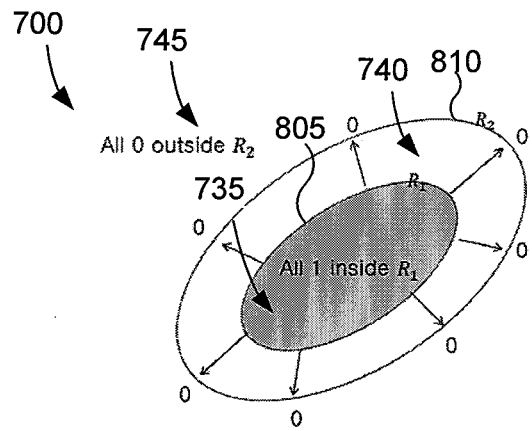
FIGS. 8A, 8B and 8C illustrate example of transition weighting factors according to various embodiments of the present disclosure.
Figure 8B:
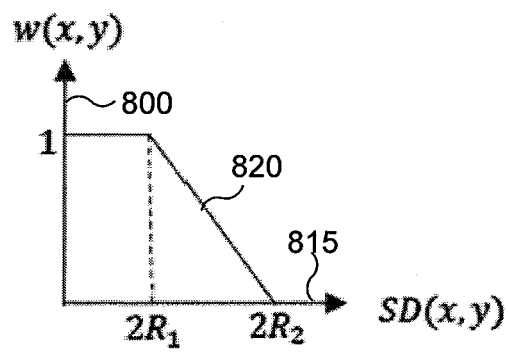
Figure 8C:
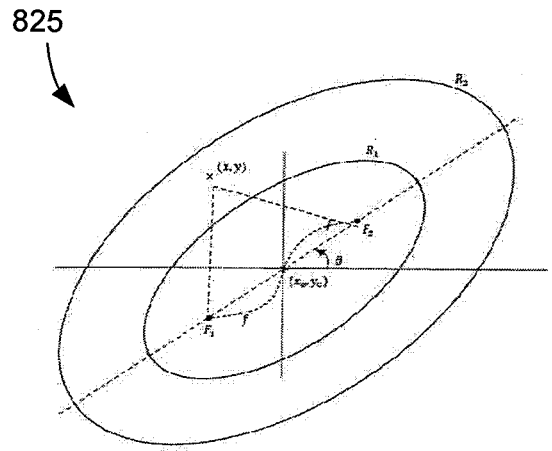

FIGS. 8A, 8B and 8C illustrate example of transition weighting factors 800 according to various embodiments of the present disclosure.

FIG. 8A illustrates an example local object expression 700 simplified to illustrates the first range 805 and the second range 810. The transition weighting factor 800 is used in the transition area 735 to transition the local area 735 to the global area 745. The pixels located with the local area 735 are processed using the local tone mapping function. The effect of the local tone mapping function is monotonically reduced in the transition area 740 as the pixels are further from the center 705. The global area 745 is not affected using the local tone mapping function, but use of multiple local tone mapping functions are possible.

FIG. 8B illustrates a transition weighting function 820 according to the various embodiments of the present disclosure. At point (x,y) in a frame, the foci points are calculated using equations 1 and 2:

$$F_1 = \begin{bmatrix} f_x^1 \\ f_y^1 \end{bmatrix} = \begin{bmatrix} \cos\theta & -\sin\theta \\ \sin\theta & \cos\theta \end{bmatrix}\begin{bmatrix} -f \\ 0 \end{bmatrix}\begin{bmatrix} x_0 \\ y_0 \end{bmatrix} \quad \text{(eq. 1)}$$

$$F_2 = \begin{bmatrix} f_x^2 \\ f_y^2 \end{bmatrix} = \begin{bmatrix} \cos\theta & -\sin\theta \\ \sin\theta & \cos\theta \end{bmatrix}\begin{bmatrix} f \\ 0 \end{bmatrix}\begin{bmatrix} x_0 \\ y_0 \end{bmatrix} \quad \text{(eq. 2)}$$

The sum of the distances (SD) 815 to the foci are calculated using equation 3:

$$SD(x,y) = \overline{OF_1} + \overline{OF_2} = \sqrt{(x-f_x^1)^2 + (y-f_y^1)^2} + \sqrt{(x-f_x^2)^2 + (y-f_y^2)^2}$$

Once the SD 815 has been calculated, a weight factor w(x,y) 800 can be determined through a linear mapping such as the example transition weighting function 820. The transition weighting factor 800 can be illustrated as shown in FIG. 8C where x is the pixel to determine the weight factor 800 of the local object expression 700.

Figure 9:
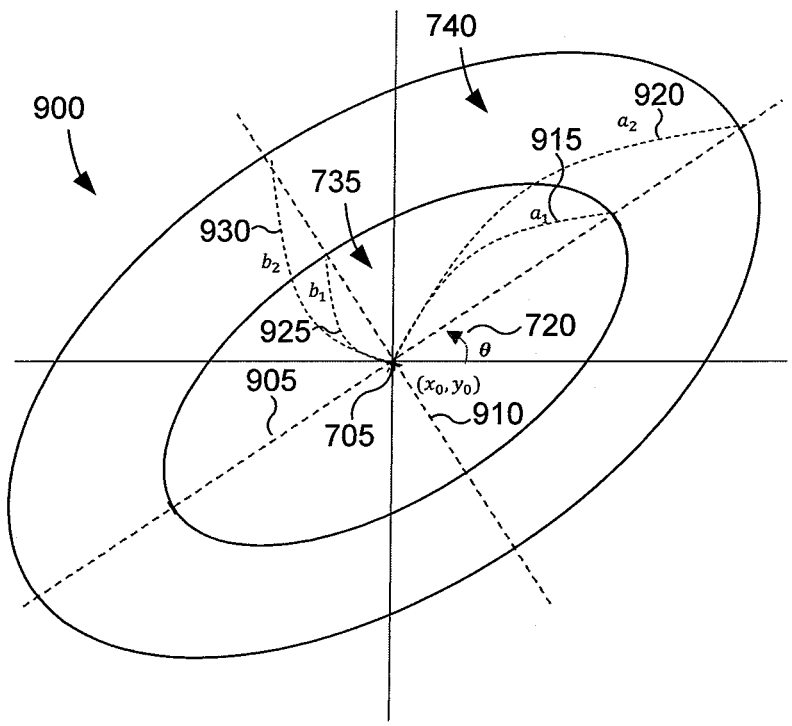
FIG. 9 illustrates an example of a local object expression according to various embodiments of the present disclosure.

FIG. 9 illustrates an example of a local object expression 900 according to various embodiments of the present disclosure. While an ellipse shape is used for the local object expressions 700, other shapes are within the scope of this disclosure.

The local object expressions 900 are used as the LCI-C 310 and 410. The ellipse is parameterized using (x0, y0) as the center 705, $\theta$ as the degree of rotation 720, $b_1$ as a first minor axis distance 925, $b_2$ as a second minor axis distance 930, $a_1$ as a first major axis distance 915, $a_2$ as a second major axis distance 920.

Figure 10:
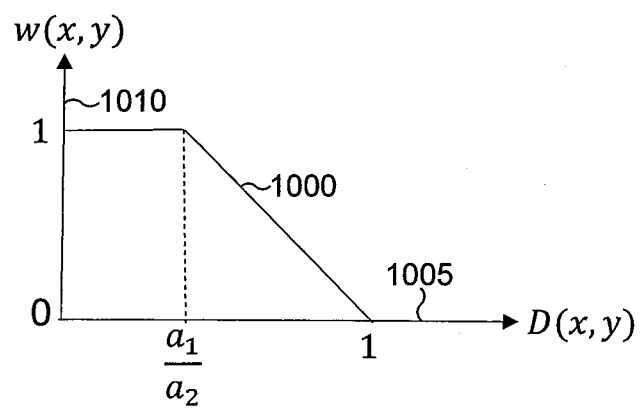
FIG. 10 illustrates an example of a transition weighting factor according to various embodiments of the present disclosure.

FIG. 10 illustrates an example of a transition weighting factor 1010 according to various embodiments of the present disclosure. At point (x,y) in a frame, the foci points are calculated using equation 4:

$$\begin{bmatrix} x' \\ y' \end{bmatrix} = \begin{bmatrix} \cos\theta & \sin\theta \\ -\sin\theta & \cos\theta \end{bmatrix}\begin{bmatrix} x - x_0 \\ y - y_0 \end{bmatrix} + \begin{bmatrix} x_0 \\ y_0 \end{bmatrix}$$

The sum of the distances (D) 815 to the pixel from the center are calculated using equation 5:

$$D(x, y) = \sqrt{\frac{(x' - x_0)^2}{a_2^2} + \frac{(y' - y_0)^2}{b_2^2}}$$

Once the D(x,y) 1005 has been calculated, a weight factor w(x,y) 1010 can be determined through a linear mapping such as the example transition weighting function 1000.

Figure 11:
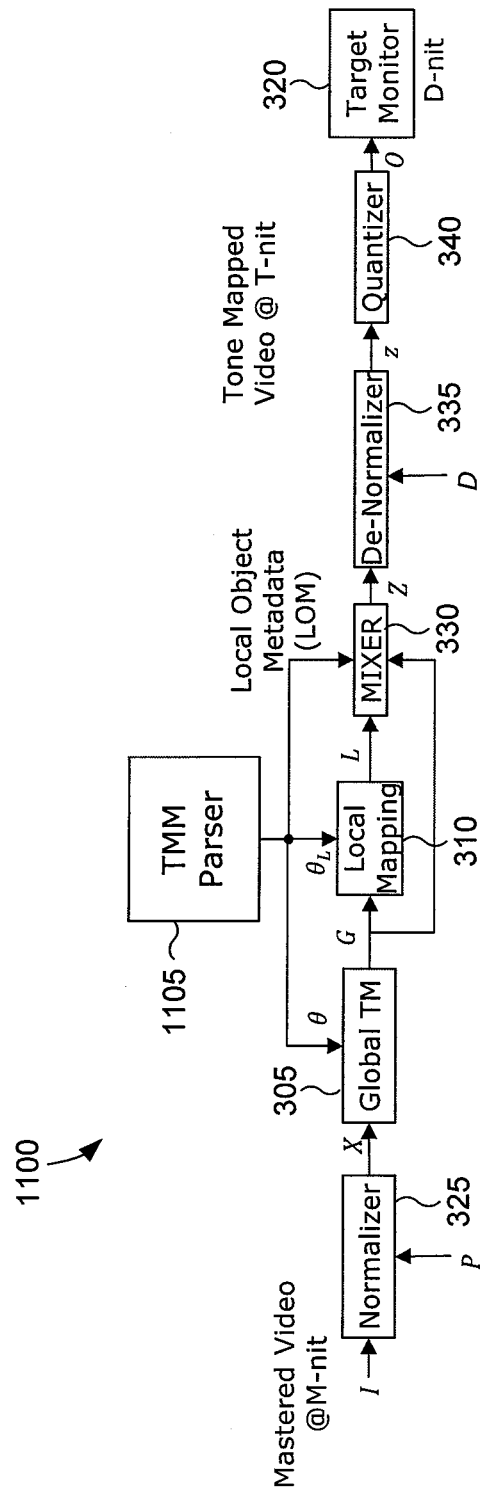
FIG. 11 illustrates an example tone mapping system implemented in an electronic device according to various embodiments of the present disclosure.
Figure 12:
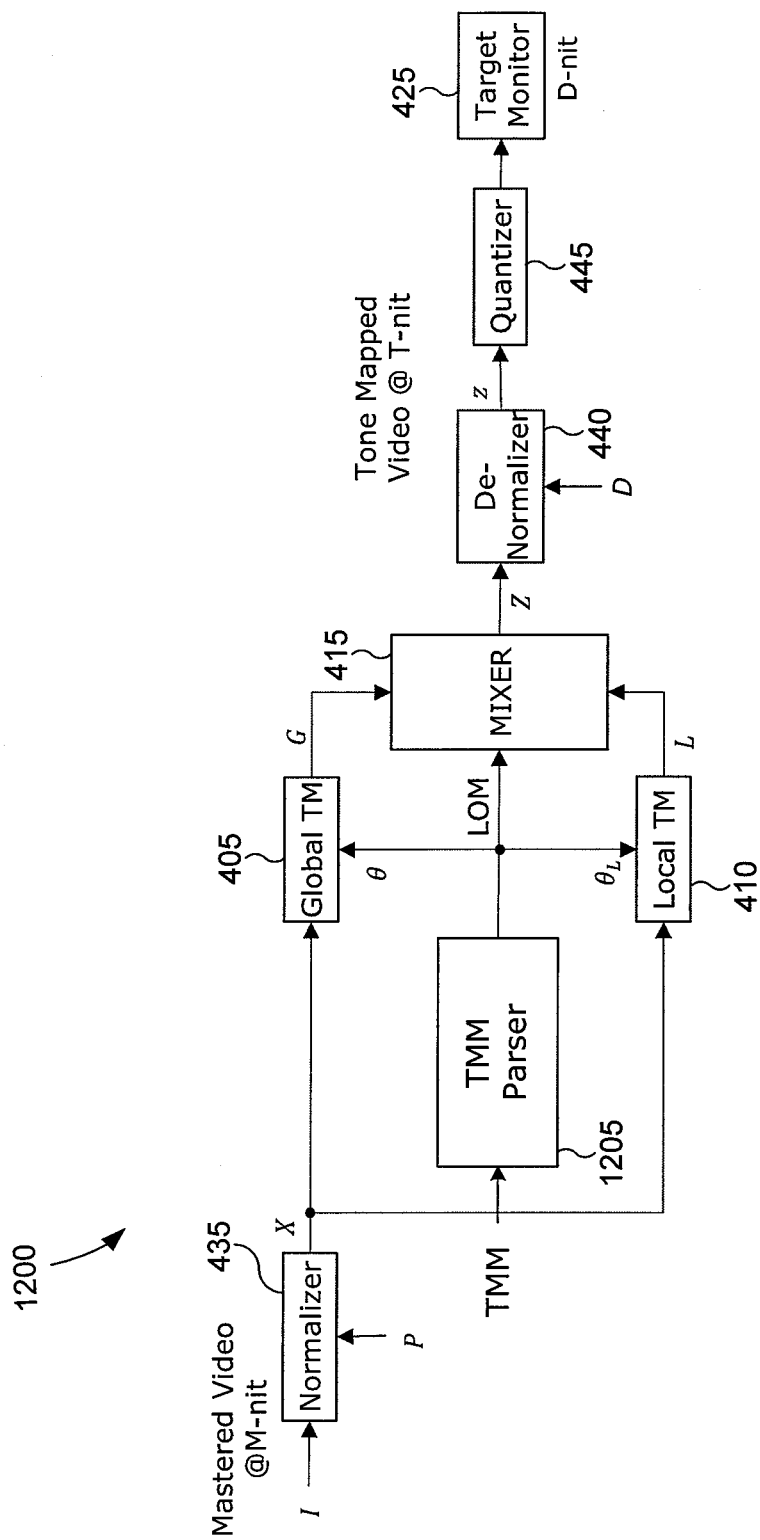
FIG. 12 illustrates an example tone mapping system implemented in an electronic device according to the various embodiments of the present disclosure.

FIG. 11 illustrates an example tone mapping system implemented in an electronic device according to various embodiments of the present disclosure. FIG. 12 illustrates an example tone mapping system implement in an electronic device according to the various embodiments of the present disclosure. FIGS. 11 and 12 illustrate tone mapping block similar to FIGS. 3 and 4, respectively implemented in a device. The tone mapping functions 1100 and 1200 include TMM parsers 1105 and 1205 in place of user interfaces 315 and 420. The TMM parsers receive tone mapping metadata for input into the GCI-C 305 and 405, the LCI-C 310 and 410, and the mixers 330 and 415. The TMM includes the control points, transition weighting factors, or any other parameters required by the GCI-C 305 and 405, the LCI-C 310 and 410, and the mixers 330 and 415.

Figure 13:
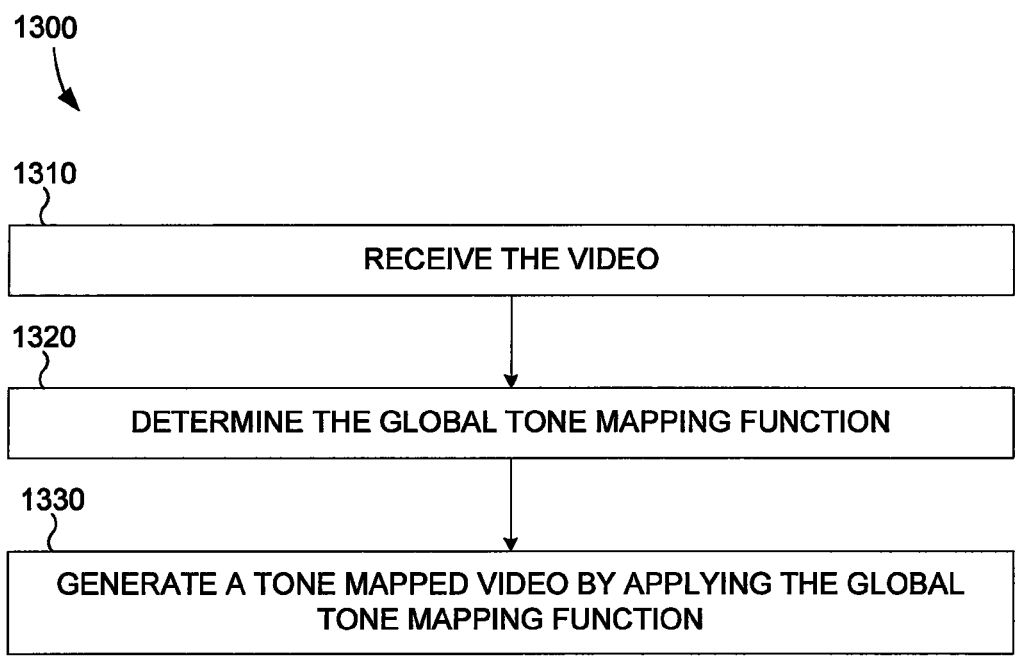
FIG. 13 illustrates an example process for video tone mapping according to various embodiments of the present disclosure.

FIG. 13 illustrates an example process 1300 for video tone mapping in accordance with various embodiments of the present disclosure. For example, the process 1300 may be performed by the server 104 or the client devices 106-115 in FIG. 1. In particular, the process 1300 can be implemented by any one of the systems 300-500 and 700-705 in FIG. 3-5 or 7 discussed above, referred to collectively here as "the system." The embodiment of the process 1300 shown in FIG. 13 is for illustration only. Other embodiments could be used without departing from the scope of the present disclosure. While particular blocks of the process 1300 are described below as being performed by specific blocks of one of the systems 300-500 and 700-705, it will be understood that any suitable block can perform each of the blocks of the process 1300 in alternative example embodiments.

In block 1310, the system receives the video for processing. For example, the video may be a mastered video file from a color grading tool 210. The mastered video file can be color graded in a color grading module 210 and quantized by a quantizer 215. The mastered video file can be tone mapped on a mastering monitor 220 with a high nit value, such as 4$k$ nit. The master video file can be encoded in an encoder 232 for transport over a network. A tone mapping tool 230 can be used to create tone mapping metadata 235 to be sent over the network with the mastered video. The metadata 235 includes information at least partially representative of a global tone mapping function 500 and local tone mapping functions 505 and 510. The metadata could also include information on the peak luminance values for the video, the mastering monitor 220 and different target displays 245, 265, 320, and 425. The metadata could also include transition weighting functions 800 and 1000. In certain embodiments, the parameters for the local tone mapping functions are parameterized based on an ellipsis. The parameters can include, for example, either (1) a location on the image that the elliptical shape is centered (i.e., 705 on FIG. 7), a focus distance (i.e., 710 on FIG. 7), an angle of rotation of the elliptical shape (i.e., 720 on FIG. 7), a first range distance and a second range distance (i.e., 725, and 730 on FIG. 7), or (2) a location on the image that the elliptical shape is centered, an angle of rotation of the elliptical shape, a first major axis distance and a second major distance, and a first minor axis distance and second minor axis distance on a minor axis.

In block 1320, the system determines the global tone mapping function 500 for tone mapping the video. For example, block 1320 may be implemented by tone mapping block 260 in FIG. 5. In certain embodiments, the tone mapping block also determines the local tone mapping functions 505 and 510. The global mapping functions and local mapping function can be defined by an explicit Bezier curve. When the functions are defined by the Bezier curve, the metadata can include the control points of the Bezier curve. The tone mapping block determines the order of the Bezier curve based on the amount of control points.

In block 1330, the system generates a tone mapped video by applying the tone mapped function. For example, the parameterized tone mapping function 510 processes the video using the Bezier curve 830. The video is processed pixel-by-pixel to determine the tone mapped nit value for the video tone mapped for the video display 500. Using the Bezier curve defined function with the control points, each pixel can be process from the master video file to the video for the target display. Multiple local mapping functions can be applied to the video. The local mapping functions can be applied in series or in parallel with other local mapping functions or the global mapping function. For example, the metadata can include data that is indicative of the manner in which local tone mapping functions are applied, such as the order in which multiple tone mapping functions are to be applied. These tone mapping functions are mixed by a mixer 330 and 415. The local tone mapping function can be applied using the parameters received in the metadata. A transition weighting factor is used in the mixer 330 and 415 to transition the effect of the local tone mapping function with the effect of the global tone mapping function or other local tone mapping functions.

As stated above, in an example embodiment, the process 1300 can apply block 1330 in a pixel-by-pixel manner. For example, the process 1300 can select a pixel of a frame of the received video. For the selected pixel, the process 1300 determines which, if any, local tone mapping functions correspond to the pixel. For example, a local tone mapping function corresponds to the pixel if the process 1300 determines that the pixel is included within the first and/or second range of the local object expressions (e.g., described in connection with FIGS. 7 and 9). Because local tone mapping functions can fully and/or partially overlap, more than one local tone mapping function can correspond to the selected pixel. The process 1300 applies the corresponding local tone mapping functions in accordance with the metadata (e.g., with respect to the order in which the local tone mapping functions are applied) to the current pixel. Additionally or alternatively, the process 1300 applies a global tone mapping function, if any. As stated, the processing of the local and global tone mapping functions can be performed in accordance with FIGS. 4, 6, 11, and 12. After the selected pixel has been processed, the process 1300 can repeat the processing of block 1330 for each remaining pixel of the frame until all pixels have been processed.

Although FIG. 13 illustrates an example of process for video tone mapping various changes could be made to FIG. 13. For example, while shown as a series of blocks, various blocks in each figure could overlap, occur in parallel, occur in a different order, or occur multiple times.

Figure 14:
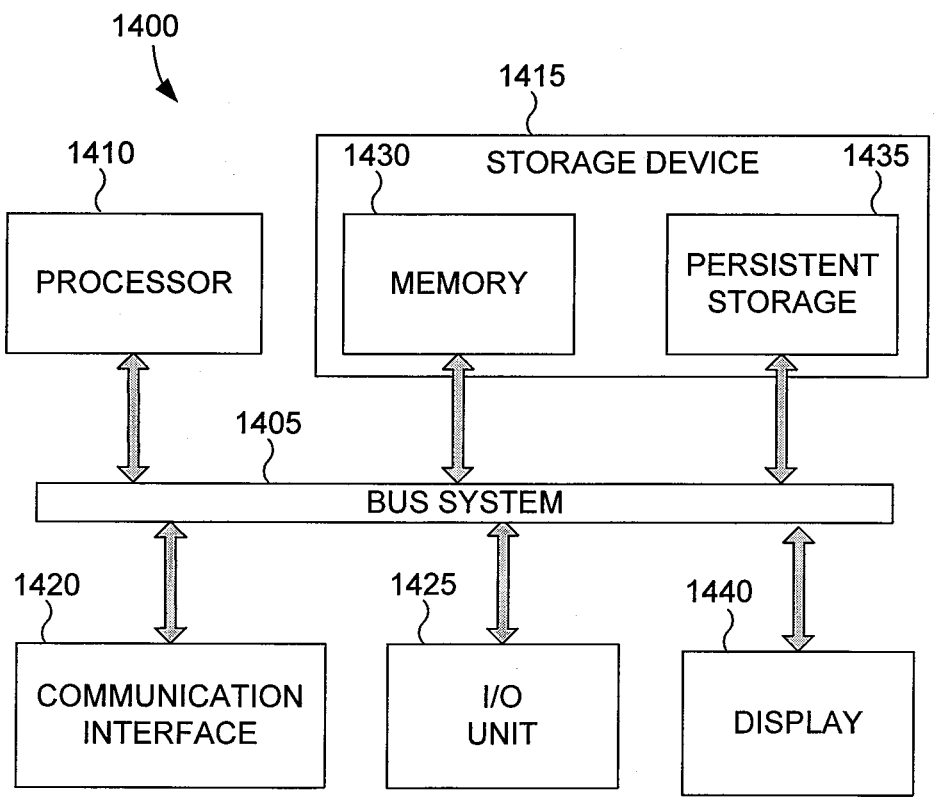
FIG. 14 illustrates an example video processing device according to this disclosure.

FIG. 14 illustrates an example video processing device 1400 according to this disclosure. In particular, the video processing device 1400 illustrates example components that may be included in any one of the server 104 or the client devices 106-115 in FIG. 1 to implement one or more embodiments of the present disclosure.

As shown in FIG. 14, the video processing device 1400 includes a bus system 1405, which supports communication between at least one processor 1410, at least one storage device 1415, at least one communication interface 1420, at least one input/output (I/O) unit 1425, and a display 1440.

The processor 1410 executes instructions that may be loaded into a memory 1430. The processor 1410 may include any suitable number(s) and type(s) of processors or other devices in any suitable arrangement. Example types of processor 1410 include microprocessors, microcontrollers, digital signal processors, field programmable gate arrays, application specific integrated circuits, and discreet circuitry. For example, the processor 1410 may implement tone mapping operations performed by any of the processes or systems 200-1300 being implemented in hardware or by executing stored instructions that causes the processor 1410 to perform the disclosed methods.

The memory 1430 and a persistent storage 1435 are examples of storage devices 1415, which represent any structure(s) capable of storing and facilitating retrieval of information (such as video data, program code, and/or other suitable information on a temporary or permanent basis). The memory 1430 may represent a random access memory or any other suitable volatile or non-volatile storage device(s). For example, the memory 1430 may contain instructions for implementing tone mapping techniques and/or may store streamed or buffered video data received from a server 104. The persistent storage 1435 may contain one or more components or devices supporting longer-term storage of data, such as a read-only memory, hard drive, Flash memory, or optical disc. For example, the persistent storage 1435 may contain video data such as a mastered video file and metadata associated with the mastered video file.

The communication interface 1420 supports communications with other systems or devices. For example, the communication interface 1420 could include a network interface card, a cable modem, a broadcast receiver, or a wireless transceiver facilitating communications over the network 102. The communication interface 1420 may support communications through any suitable physical or wireless communication link(s).

The I/O unit 1425 allows for input and output of data. For example, the I/O unit 1425 may provide a connection for user input through a keyboard, mouse, keypad, touchscreen, or other suitable input device. The I/O unit 1425 may also send output to the display 1440, printer, or other suitable output device.

The video processing device 1400 further includes or is connected to a display 1440, such as, for example, the target displays 245, 265, 320, and 425. In one example embodiment, the video processing device 1400 may be video processing circuitry included in a set top box, cable box, computer, etc. connected to the display 1440 for tone mapped video to be displayed. In another example embodiment, the video processing device 1400 may be the set top box, cable box, computer, media player, etc. connected to the display 1440 for tone mapped video to be displayed. In yet another example embodiment, the video processing device 1400 may be a server connected to the target display 1440 over a network connection. In another example embodiment, the video processing device 1400 may include the display 1440 that the tone mapped video to be displayed on as well as the video processing circuitry for performing the tone mapping. For example, the video processing device 1400 may be a television, monitor, mobile phone, laptop computer, tablet computer, etc.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. §112(f) unless the exact words "means for" are followed by a participle.

What is claimed is:

1. A method for tone mapping of a video for a display, the method comprising:
   receiving the video and metadata, wherein the metadata is at least partially representative of a global tone mapping function;
   determining the global tone mapping function based at least on the metadata and an identified characteristic of the display; and
   generating, by at least one processor, a tone mapped video by applying the determined global tone mapping function to the video, based on an identified peak luminance value characteristic of the display in application of the global tone mapping function, and by processing individual pixels of a frame for the video, wherein a transition weighing factor is used to mix the individual pixels between the global tone mapping function and a local mapping function.

2. The method of claim 1, wherein the metadata is further representative of local tone mapping functions, and wherein generating the tone mapped video further comprises applying a local tone mapping function to the video.

3. The method of claim 2, wherein the global tone mapping function and the local tone mapping functions correspond to an explicit Bezier curve.

4. The method of claim 2, wherein the local tone mapping functions are applied using an elliptical shape that is parameterized by one of:
   a location on a frame of the video that the elliptical shape is centered, a focus distance, an angle of rotation of the elliptical shape, a first range distance and a second range distance, or
   a location on the frame that the elliptical shape is centered, an angle of rotation of the elliptical shape, a first major axis distance and a second major distance, and a first minor axis distance and second minor axis distance on a minor axis.

5. The method of claim 4, wherein the metadata further includes a transition weighting function used to monotonically diminish an effect of the local tone mapping functions between the first range distance and the second range distance.

6. The method of claim 2, wherein the global tone mapping function and the local tone mapping functions are applied in series or in parallel.

7. The method of claim 1, wherein the metadata includes a peak luminance value of the video and the characteristic of the display includes a peak luminance value of the display.

8. An apparatus comprising:
   a memory; and
   at least one processor operably connected to the memory, the at least one processor configured to:
   receive a video and metadata, wherein the metadata is at least partially representative of a global tone mapping function;
   determine the global tone mapping function based at least on the metadata and an identified characteristic of a display; and
   generate a tone mapped video by applying the determined global tone mapping function to the video, based on an identified peak luminance value characteristic of the display in application of the global tone mapping function, and by processing individual pixels of a frame for the video, wherein a transition weighing factor is used to mix the individual pixels between the global tone mapping function and a local mapping function.

9. The apparatus of claim 8, wherein the metadata is further representative of local tone mapping functions, and wherein to generate the tone mapped video further comprises applying a local tone mapping function to the video.

10. The apparatus of claim 9, wherein the global tone mapping function and the local tone mapping functions correspond to an explicit Bezier curve.

11. The apparatus of claim 9, the local tone mapping functions are applied using an elliptical shape that is parameterized by one of:
    a location on a frame of the video that the elliptical shape is centered, a focus distance, an angle of rotation of the elliptical shape, a first range distance and a second range distance, or
    a location on the frame that the elliptical shape is centered, an angle of rotation of the elliptical shape, a first major axis distance and a second major distance, and a first minor axis distance and second minor axis distance on a minor axis.

12. The apparatus of claim 11, wherein the metadata further includes a transition weighting function used to monotonically diminish an effect of the local tone mapping functions between the first range distance and the second range distance.

13. The apparatus of claim 9, wherein the global tone mapping function and the local tone mapping functions are applied in series or in parallel.

14. The apparatus of claim 8, wherein the metadata includes a peak luminance value of the video and the characteristic of the display includes a peak luminance value of the display.

15. A non-transitory computer readable medium comprising program code, that when executed by at least one processor, causes the at least one processor to:

receive a video and metadata, wherein the metadata is at least partially representative of a global tone mapping function;

determine the global tone mapping function based at least on the metadata and an identified characteristic of a display; and generate a tone mapped video by applying the determined global tone mapping function to the video, based on an identified peak luminance value characteristic of the display in application of the global tone mapping function, and by processing individual pixels of a frame for the video, wherein a transition weighing factor is used to mix the individual pixels between the global tone mapping function and a local mapping function.

16. The non-transitory computer readable medium of claim 15, wherein the metadata is further representative of local tone mapping functions, and wherein generating the tone mapped video further comprises applying a local tone mapping function to the video.

17. The non-transitory computer readable medium of claim 16, wherein the global tone mapping function and the local tone mapping functions correspond to an explicit Bezier curve.

18. The non-transitory computer readable medium of claim 15, wherein the metadata includes a peak luminance value of the video and the characteristic of the display includes a peak luminance value of the display.

19. A method for tone mapping of a video for a display, the method comprising:

receiving the video and metadata, wherein the metadata is at least partially representative of a global tone mapping function;

determining the global tone mapping function based at least on the metadata and a characteristic of the display; and generating, by at least one processor, a tone mapped video by applying the global tone mapping function to the video and using a peak luminance value characteristic of the display in application of the global tone mapping function, wherein the global tone mapping function corresponds to an explicit Bezier curve.

* * * * *